United States Patent [19]
McMillan et al.

[11] Patent Number: 5,772,701
[45] Date of Patent: Jun. 30, 1998

[54] METHOD OF MAKING TANTALUM CAPACITORS

[75] Inventors: April D. McMillan, Knoxville; Robert E. Clausing, Oak Ridge, both of Tenn.; William F. Vierow, Saco, Me.

[73] Assignee: Lockheed Martin Energy Research Corporation, Oak Ridge, Tenn.

[21] Appl. No.: 708,424

[22] Filed: Sep. 5, 1996

[51] Int. Cl.$^6$ .................................. B22F 1/00; H01G 9/05
[52] U.S. Cl. ........................... 29/25.03; 361/529; 75/245; 75/356; 75/314; 419/2; 419/29; 419/39; 419/56
[58] Field of Search ............................... 361/529; 75/245, 75/356, 314; 29/25.03; 419/2, 29, 39, 56

[56] References Cited

U.S. PATENT DOCUMENTS

| | | |
|---|---|---|
| 3,779,717 | 12/1973 | Gustison . |
| 3,934,179 | 1/1976 | Pierret . |
| 4,079,441 | 3/1978 | Bush et al. . |
| 4,113,240 | 9/1978 | Klein . |
| 5,184,286 | 2/1993 | Lauf et al. . |

*Primary Examiner*—David Graybill
*Attorney, Agent, or Firm*—Morgan & Finnegan LLP

[57] ABSTRACT

A method for manufacturing tantalum capacitors includes preparing a tantalum compact by cold pressing tantalum powder, placing the compact, along with loose refractory metal powder, in a microwave-transparent casket to form an assembly, and heating the assembly for a time sufficient to effect at least partial sintering of the compact and the product made by the method.

14 Claims, 1 Drawing Sheet

METHOD OF MAKING TANTALUM CAPACITORS

FIELD OF THE INVENTION

The present invention relates generally to methods of making powder metallurgy components, and more specifically, to an improved method which uses tantalum powder as an insulation material to make tantalum anodes in the production of tantalum capacitors. Tantalum compacts, along with loose tantalum powder, are placed in a microwave-transparent casket and heated with microwave energy to effect at least partial sintering of the compacts.

BACKGROUND OF THE INVENTION

It is generally known that metals are difficult, if not impossible, to heat directly with microwave powder because of high electrical conductivity which causes microwaves to be reflected away from the metals.

In order to absorb the microwave energy, casketing techniques have been employed. these methods provide a combination of direct and indirect heating such that sintering temperatures can be achieved.

U.S. Pat. No. 5,184,286 to Lauf et al. discloses a prior art casketing method that uses refractory materials. While the methods described therein have advantages over methods previously used, contamination from the insulation material (or materials) remained an unsolved problem.

Because the cleanliness of a tantalum anode is crucial in anodization, contamination from insulation can lead to a decrease in allowable voltage and reduced reliability. Thus, a continuing need exists for improved method of manufacturing tantalum anodes.

SUMMARY OF THE INVENTION

An object of the present invention is to provide an improved method of manufacturing tantalum capacitors which reduces or eliminates contamination from insulation materials, thereby achieving a cleaner and thus better performing tantalum anode.

Another object of the present invention is to provide an improved method of manufacturing tantalum capacitors which uses an insulating material or composite material or mixture of materials which not only provides the thermal insulation but includes the ability to simultaneously act as a getter of residual gases, particularly oxygen.

Still another object of the present invention is to provide an improved method of manufacturing tantalum capacitors in which an insulating material that does not shield the capacitors is used, thereby achieving good sintering without contamination.

These and other objects of the present invention are met by providing a method of manufacturing tantalum capacitors which includes the steps of preparing a tantalum powder compact, placing the compacts, along with loose tantalum powder, inside a microwave-transparent casket to form an assembly, and heating the assembly in a microwave heating apparatus to effect at least partial sintering of the tantalum compacts.

Other objects, advantages and salient features of the invention will become apparent from the following detailed description, which taken in conjunction with the annexed drawings, discloses preferred embodiments of the invention.

DETAILED DESCRIPTION OF THE PREFERRED EMBODIMENTS

Figure 1:
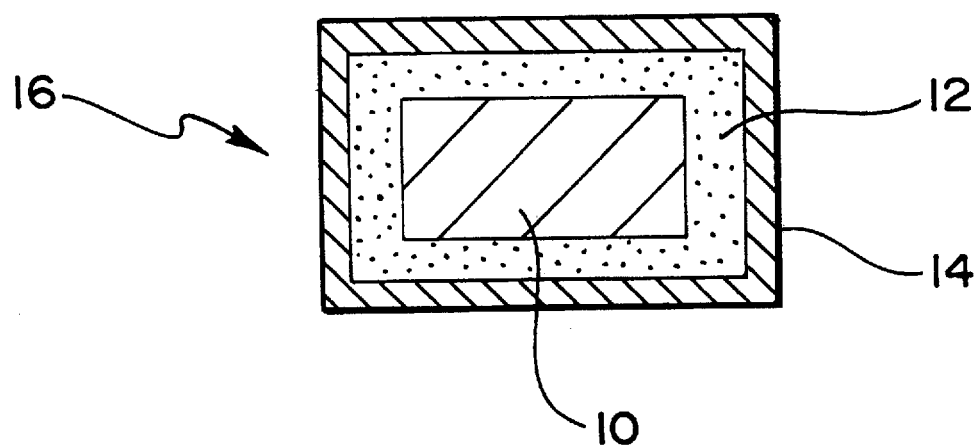
FIG. 1 is a schematic, vertical sectional view illustrating a tantalum compact, surrounded by tantalum powder, inside a microwave transparent casket.

The present invention deviates from the methods described in the aforementioned U.S. Pat. No. 5,184,286, which is incorporated herein by reference, after the formation of tantalum powder compacts. Briefly, compacts are prepared by cold pressing a mixture of tantalum powder particles and small amounts of organic or inorganic binders and lubricants, if required. The compacts are then placed in a conventional vacuum furnace and heated to remove the binders and lubricants.

According to the present invention, and with reference to FIG. 1, a tantalum powder compact 10, made by the aforementioned methods, is placed along with loose tantalum powder 12 inside a microwave-transparent casket 14 to form an assembly 16.

The assembly is then heated in a microwave heating apparatus (not shown), with an oxygen partial pressure of less than about $1 \times 10_{-2}$ Torr, for a time sufficient to effect at least partial sintering of the tantalum compact.

While U.S. Pat. No. 5,184,286 demonstrated that tantalum capacitors could be microwave sintered, it relied on ceramic casketing materials which contributed to the contamination of the product. According to the present invention, tantalum powder serves not only as the insulating material, but also a getter for residual gases, such as oxygen. The tantalum also provides microwave coupling and provides insulation without reacting with the tantalum.

Microwave verses conventional vacuum sintering methods could result in reduced total power consumption, i.e., lower power and shorter residence times. Total power required could be significantly less than presently required with conventional methods, thus resulting in a manufacturing cost savings.

With the utilization of finer grain and agglomerated tantalum powders, it becomes critical to preserve porosity and the resulting internal surface area. The sub-micron/finer grain tantalum materials are incorporated to realize increased surface areas. Shorter sintering times and lower temperature must be employed or consolidation will occur negating the fine grain material's advantage. Microwave sintering very likely will result in improved temperature control, heat application, and narrower spread of the resulting anode capacitance rating tolerance.

A microwave sintering system could be configured to provide for a continuous in-line sintering process. In the tantalum anode preparation process, this could result in a substantial process cost reduction over the present "standard" batch processing techniques.

Once the tantalum anodes have been made pursuant to the methods described above, the tantalum capacitor can be completed using the methods described in U.S. Pat. No. 5,184,286. For example, the sintered compacts are subsequently anodized to form a continuous tantalum oxide layer on their exposed surface areas. The anodized compacts are then impregnated with a semi-conductive contact material, and then wire leads are attached to the infiltrated compacts to form an electrical capacitor. The capacitor can then be packaged into any number of usable forms.

For example, tantalum compacts were prepared by conventional techniques (Ta powder having a surface area of at least 25,000 uF/V/g and using an organic binder were cold pressed around Ta wire electrodes). These compacts had been delubed before sintering. Several compacts were placed in a microwave transparent (boron nitride) casket which was then filled with loose tantalum powder to completely cover the compacts and tantalum wires. A boron nitride (BN) lid was then placed on top of the casket. This assembly was then placed inside a larger microwave transparent BN crucible and covered with hollow alumina bubbles. A BN lid was placed over the entire assembly, which was then placed into the applicator cavity of a variable frequency microwave furnace as described in U.S. Pat. No. 5,321,222.

Samples were heated using microwaves of 6±0.75 GHz, sweeping at a rate of 4000 Hz with an average forward power of 1kW while maintaining a vacuum in the chamber of $10_{-6}$ Torr. The entire assembly heated well, easily maintaining the appropriate sintering temperature of 1500°–1600° C. We discovered surprisingly that the presence of Ta powder surrounding the compacts did not interfere with the microwave heating process, provided the necessary thermal insulation around the compacts, and also surprisingly suppressed arcing that one would have expected because of the wire electrodes.

The compacts were removed from the casket after sintering. Excess loose Ta powder was removed. The sintered pellets were strong and had adequate porosity; and in contrast to earlier anodes produced in accordance with U.S. Pat. No. 5,184,286, these anodes showed no evidence of contamination, oxidation, or any other deleterious reaction with the insulating material, yet they retained the surface ripples that previous work has shown to be characteristic of microwave sintered tantalum powder (FIG. 3).

The anodes were then anodized according to standard procedure (100 volts for 60 minutes) and tested, the results of which are shown in FIG. 2. These samples were processed at the same nominal time and power as with conventional methods; however, one can see from the data that more sintering occurred in the samples processed via variable frequency microwaves.

Those skilled in the art will appreciate that one could, therefore, decrease sintering time and/or temperature to provide a product with higher capacitance and shorter overall processing cycle time.

Additionally, those skilled in the art will appreciate that the inventive process can be modified to operate in a continuous mode by passing small, individual caskets (as illustrated schematically in FIG. 1) through a microwave heating cavity one after the other.

Skilled artisans will appreciate that compacts of some grades of tantalum powder can be pressed without binders and lubricants, and that binders and lubricants may be organic or inorganic materials.

Although the invention has been described in conjunction with specific embodiments, it is evident that many alternatives and variations will be apparent to those skilled in the art in light of the foregoing description. Accordingly, the invention is intended to embrace all of the alternatives and variations that fall within the spirit and scope of the appended claims.

What is claimed is:

1. A method of manufacturing a tantalum anode for a tantalum capacitor, comprising the steps of:

preparing a tantalum powder compact;

placing the tantalum compact, along with loose refractory metal powder, inside an electromagnetic radiation-transparent casket to form an assembly; and heating the assembly in an electromagnetic radiation heating apparatus for a time sufficient to effect at least partial sintering of the tantalum compact.

2. A method according to claim 1, further comprising maintaining an oxygen partial pressure of less than about $1\times10^{-4}$ Torr during the heating step.

3. A method according to claim 1, wherein the step of preparing a tantalum powder compact includes cold pressing tantalum powder and a binder material.

4. A method according to claim 1, wherein the heating apparatus is a microwave heating apparatus, and the casket is microwave-transparent.

5. A method according to claim 4, wherein said microwave heating apparatus is a variable frequency apparatus.

6. A tantalum anode for use in a tantalum capacitor made according to the method of claim 1.

7. A method for manufacturing a tantalum capacitor comprising the steps of:

preparing a tantalum powder compact;

placing the tantalum compact, along with loose refractory metal powder, inside an electromagnetic radiation-transparent casket to form an assembly;

heating the assembly in an electromagnetic radiation heating apparatus for a time sufficient to effect at least partial sintering of the tantalum compact;

anodizing the compact to form a continuous tantalum oxide layer on exposed surfaces of the compact;

impregnating the anodized compacts with a semi-conductive contact material;

attaching wire leads to the impregnated compacts to form an electrical capacitor; and sealing the capacitor hermetically.

8. A method according to claim 7, further comprising maintaining an oxygen partial pressure of less than about $1\times10^{-4}$ Torr during the heating step.

9. A method according to claim 7, wherein the step of preparing a tantalum powder compact includes cold pressing tantalum powder and a binder material.

10. A method according to claim 7, wherein the heating apparatus is a microwave heating apparatus, and the casket is microwave-transparent.

11. A method according claim 10, wherein said microwave heating apparatus is a variable frequency apparatus.

12. A tantalum capacitor made according to the method of claim 7.

13. The method of claim 1 wherein said refractory metal powder is selected from the group comprising Ta, Nb, and their alloys.

14. The method of claim 7 wherein said refractory metal powder is selected from the group comprising Ta, Nb, and their alloys.

* * * * *